(12) United States Patent
Shah et al.

(10) Patent No.: US 11,842,149 B2
(45) Date of Patent: Dec. 12, 2023

(54) SYSTEM AND METHOD FOR MAINTENANCE OF A FLEET OF MACHINES

(71) Applicant: General Electric Company, Schenectady, NY (US)

(72) Inventors: Tapan Shah, Bangalore (IN); Karthika Ravigopal Nair, Bangalore (IN); Mathews Matson Chavarukattil, Bangalore (IN); Sridhar Venkataraman Dasaratha, Bangalore (IN); Shailendra Singh, Bangalore (IN); Siva Sateesh Irinki, Bangalore (IN)

(73) Assignee: General Electric Company, Schenectady, NY (US)

( * ) Notice: Subject to any disclaimer, the term of this patent is extended or adjusted under 35 U.S.C. 154(b) by 723 days.

(21) Appl. No.: 16/976,099

(22) PCT Filed: Feb. 28, 2019

(86) PCT No.: PCT/US2019/020076
§ 371 (c)(1),
(2) Date: Aug. 27, 2020

(87) PCT Pub. No.: WO2019/169147
PCT Pub. Date: Sep. 6, 2019

(65) Prior Publication Data
US 2020/0410163 A1      Dec. 31, 2020

(30) Foreign Application Priority Data
Mar. 2, 2018      (IN) .............................. 201841007877

(51) Int. Cl.
*G06F 40/205*      (2020.01)
*G06F 40/274*      (2020.01)
(Continued)

(52) U.S. Cl.
CPC ........ *G06F 40/205* (2020.01); *G06F 9/30036* (2013.01); *G06F 9/5072* (2013.01); *G06F 40/274* (2020.01); *G06N 3/08* (2013.01)

(58) Field of Classification Search
USPC ................................................ 704/7–10, 257
See application file for complete search history.

(56) References Cited

U.S. PATENT DOCUMENTS

| | | |
|---|---|---|
| 6,507,831 B1 | 1/2003 | Varma et al. |
| 2002/0049053 A1 | 4/2002 | Nomura et al. |

(Continued)

OTHER PUBLICATIONS

Chunye Wang et al: "Knowledge Extraction and Reuse within "Smart" Service Centers", SRII Global Conference (SRII), 2011 Annual, IEEE, Mar. 29, 2011 (Mar. 29, 2011), pp. 163-176, XP031897213, DOI: 10.1109/SRII.2011.28.

(Continued)

*Primary Examiner* — Leonard Saint-Cyr

(57) ABSTRACT

A method for maintenance of a machine among a fleet of machines includes receiving a service request corresponding to the machine. The method also includes obtaining a service architecture corresponding to the fleet of machines. The service architecture includes a service dictionary and a plurality of classification schemes organized in a tree data structure. The method also includes processing the service request based on the service dictionary and a text parsing technique to generate a list of descriptive words. The method includes generating a recommendation based on the list of descriptive words and the service architecture. The recommendation includes at least one of an on-line repair activity, an on-site repair activity and a part replacement activity. The method also includes servicing the fault condition of the machine based on the recommendation.

18 Claims, 5 Drawing Sheets

(51) Int. Cl.
*G06F 9/30* (2018.01)
*G06F 9/50* (2006.01)
*G06N 3/08* (2023.01)

(56) References Cited

U.S. PATENT DOCUMENTS

| | | | |
|---|---|---|---|
| 2005/0021294 A1* | 1/2005 | Trsar | G16H 50/20 |
| | | | 702/183 |
| 2005/0171661 A1* | 8/2005 | Abdel-Malek | G06Q 10/06 |
| | | | 701/19 |
| 2006/0288260 A1 | 12/2006 | Xiao et al. | |
| 2011/0161721 A1* | 6/2011 | Fulginiti | G06Q 10/10 |
| | | | 714/E11.029 |
| 2011/0218957 A1* | 9/2011 | Coon | G06Q 30/0601 |
| | | | 715/708 |
| 2013/0086208 A1 | 4/2013 | Heine | |
| 2014/0244213 A1 | 8/2014 | Theriot et al. | |

OTHER PUBLICATIONS

EP application 19760158.6 filed 28FEB2019—Extended Search Report dated Nov. 17, 2021; 8 pages.
Mark Devaney et al: "Preventing Failures by Mining Maintenance Logs With Case-Based Reasoning", 59th Meeting of the Society for Machinery Failure Prevention Technology (MFPT-59), 2005, Jan. 1, 2005 (Jan. 1, 2005), pp. 1-10, XP055536324.
International Search Report of the International Searching Authority for PCT/US2019/020076 dated Jun. 14, 2019.

* cited by examiner

SYSTEM AND METHOD FOR MAINTENANCE OF A FLEET OF MACHINES

BACKGROUND

System and method disclosed herein relate generally to managing maintenance of a machine among a fleet of machines and more particularly to the system and the method for efficiently processing service requests of a machine among the fleet of machines.

Fleet of machines, such as, but not limited to, imaging systems, turbines and engines are increasingly being deployed over large geographic regions. In the medical field, imaging systems including modalities such as magnetic resonance imaging (MRI), computed tomography (CT), nuclear imaging, and ultrasound are increasingly being deployed in hospitals, clinics, and medical research institutions for medical imaging of subjects. Engines deployed in locomotives or aircrafts, need to operate under varying environmental conditions. In power generation systems, wind turbines or water turbines are installed to harvest energy from natural resources. For facilities owning a machine belong to a fleet of machines, it is desirable to maximize utilization of the machine with minimal downtime. However, system failures and breakdowns interrupt the workflow processes involving the machine and reduce its utilization. Most manufacturers strive to provide effective periodic maintenance routines and responsive or on call repair services. Despite the refined capability of preventive maintenance programs, machines may sometimes develop problems which need out of turn diagnosis and repair. Usually, such problems are identified by a concerned authority at the facilities that manage the installed machine. The identified problems are submitted as service requests in one or more formats, such as, but not limited to, a textual description through a webform and a voice call through a helpline.

Typically, servicing of a machine among the fleet of machines such as the imaging systems may require parts replacement or on-site visits by a field engineer to the site. Such on-site visits by field engineers can be expensive and time consuming for both customer and system manufacturer or repair facility, who typically arranges for such visits. Remote diagnosis and repair are often used to expedite system repair and obviate or minimize the need for such on-site visits. However, existing remote diagnosis and repair still entails the need to interrupt use of the imaging system and contact with the repair facility. Also, upon identification of a fault using remote diagnosis, manual intervention may be needed to submit a service request, initiate service request processing, and identify the requirement of an on-field visit. Currently, an expert is required to manually scan huge amount of data pertaining to service requests, to make and/or recommend decisions about servicing options based on the service requests. Manual processing of service requests is inefficient and adversely effects the response time. Reducing manual overhead while processing servicing requests without compromising on accuracy and response times is desirable.

BRIEF DESCRIPTION

In accordance with one aspect of the present specification, a method for maintenance of a machine among a fleet of machines is disclosed. The method includes receiving a service request corresponding to the machine. The service request comprises a description of a fault condition in the machine. The method further includes obtaining a service architecture corresponding to the fleet of machines. The service architecture includes a service dictionary and a plurality of classification schemes organized in a tree data structure. The method also includes processing the service request based on the service dictionary and a text parsing technique to generate a list of descriptive words. The method includes generating a recommendation based on the list of descriptive words and the service architecture. The recommendation includes at least one of an on-line repair activity, an on-site repair activity and a part replacement activity. The method also includes servicing the fault condition of the machine based on the recommendation.

In accordance with another aspect of the present specification, a system for maintenance of a machine among the fleet of machines is disclosed. The system includes a memory unit configured to store a request database comprising a service request corresponding to the machine. The service request includes a description of a fault condition in the machine. The memory unit is also configured to store a service architecture corresponding to the fleet of machines. The service architecture includes a service dictionary and a plurality of classification schemes organized in a tree data structure. The system further includes a text processing unit communicatively coupled to the memory unit and configured to process the service request based on the service dictionary and a text parsing technique to generate a list of descriptive words. The system further includes a recommendation unit communicatively coupled to the text processing unit and configured to generate a recommendation based on the list of descriptive words and the service architecture. The recommendation includes at least one of an on-line repair activity, an on-site repair activity and a part replacement activity. The system also includes a controller unit communicatively coupled to the recommendation unit and configured to service the fault condition of the machine based on the recommendation.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

As will be described in detail hereinafter, systems and methods for maintenance of a machine such an imaging system are presented. In various embodiments, the systems and methods are configured for efficiently processing service requests of machines belonging to a fleet of machines such as healthcare imaging systems, without or with minimal inherent workflow delays.

As used herein, the term "service request" refers to a description of a problem or a fault associated with a machine, such as an imaging system. The problem or fault may be observed during routine maintenance check, or during usage of the machine, for example, by a technician or a user. The service request may be a description in text or audio message provided by the user via a user interface and may be automatically stored in a database. As used herein, the term "descriptive key-words" refers to a list of key-words extracted from a plurality of service requests. The term "service architecture" as used herein refers to a scheme representative of a service workflow to be followed while servicing a machine such as an imaging system. The term "dictionary" as used herein refers to a data structure having a plurality of descriptive key-words and corresponding fault codes, service codes, part codes, or combinations thereof, extracted from system logs. The data structure of the dictionary includes, but not limited to, a table or a linked list. The term "service dictionary" as used herein refers specifically to a dictionary having the service codes, and the term "parts dictionary" refers to a dictionary having parts codes. The dictionary may also be a joint dictionary having a plurality of features corresponding to each of the descriptive key-words.

Figure 1A:
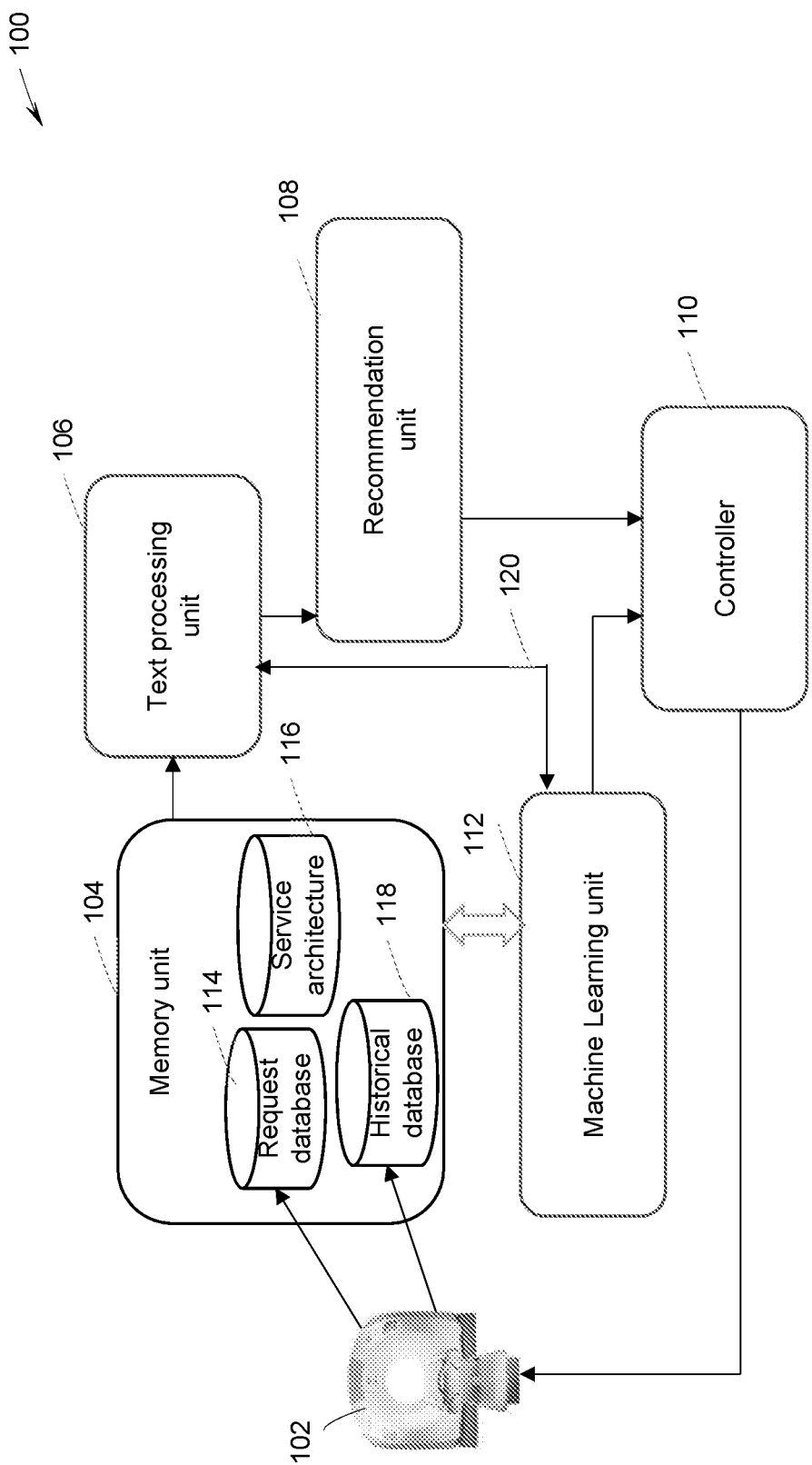
FIG. 1A is a diagrammatic illustration of a system for maintenance of a machine among a fleet of machines in accordance with an exemplary embodiment.

FIG. 1A is a diagrammatic illustration of a system 100 for maintenance of a machine among a fleet of machines in accordance with an exemplary embodiment. In the illustrated embodiment, the system 100 includes an imaging system 102 generating a service request that is recorded in a service request database 114 and stored in a memory unit 104. The service request is queued in the service request database and time delay in initiating processing of the service request depends on length of the service request queue. If the service request queue is empty, or if sufficient servicing resources are available, servicing may be initiated without any delay or in real-time. The memory unit 104 also includes a service architecture 116 configured to enable processing of the service request to generate a recommendation for servicing. The service request includes a description of a problem or a fault condition in the imaging system 102. Although the illustrated embodiment corresponds to an imaging system, embodiments disclosed herein are applicable to other systems and devices. Further, these systems and devices may be installed in geographically distributed locations. The system 100 also includes a text processing unit 106 communicatively coupled to the memory unit 104 and configured to generate a list of descriptive words from the service request. The text processing unit 106 is configured to parse natural language text in a pre-specified language using text processing techniques. Text parsing techniques for processing the service request enable automatically initiating processing of the service request. The system further includes a recommendation unit 108 communicatively coupled to the text processing unit 106 and configured to generate a recommendation based on the service architecture and the service request. The system also includes a controller unit 110 communicatively coupled to the recommendation unit 108 and configured to generate one or more control actions based on the recommendation. The controller unit 110 may direct a remote service person to perform one or more actions for correcting a fault condition of the imaging system 102. The controller unit 110 may provide recommendations to direct a field service person to replace one or more parts of the imaging system 102 or to perform one or more actions required to correct the fault condition of the imaging system 102. In one example, the one or more actions required for correcting the fault and one or more parts to be replaced are specified by the recommendation. In one embodiment, the system 100 also includes a machine learning unit 112 communicatively coupled to the memory unit 104, the text processing unit 106, and the controller unit 110 and configured to generate the service architecture. The service architecture may be stored in the memory unit 104 to be used by the recommendation unit 108. It may be noted herein that the text processing unit 106, the recommendation unit 108 and the controller unit 110 may be co-located with the imaging system 102 or located in a remote location away from the imaging system 102. The field service person is required to have physical access to the imaging system 102 and may receive recommendations from the controller unit 110 located remotely with respect to a location of the field service person.

In one embodiment, the memory unit 104 includes a request database 114 configured to store a plurality of service requests. The request database 114 includes a plurality of service requests corresponding to one or more imaging systems, such as the imaging system 102. Although the illustrated embodiment of the system 100 is related to the imaging system 102, the system 100 may also be used for maintenance of other types of machines such as an engine corresponding to a fleet of locomotive (or aircraft) engines, and a turbine among a fleet of wind turbines. When the machine is the imaging system 102, non-limiting examples may include imaging systems, such as, but not limited to, a magnetic resonance (MR) scanner, a computed tomography (CT) scanner, and an ultrasound scanner. The service requests are usually logged by users of the imaging system 102 in the event of faulty operation. However, in some embodiments, the service requests may also be automatically generated by the machine based on heuristics. The plurality of service requests may be received by the request database 114 at different time instants and may be collected by one or more geographical locations. In one embodiment, each of the plurality of service requests includes a description of a fault or a problem faced by the user. The description may be provided in one or more prescribed natural languages. Further, each of the plurality of service requests has an associated time stamp that is representative of the time when the service request is raised, submitted, or transmitted to the request database 114. In alternative embodiments, the service requests may include one or more pre-defined sentences describing the problem/fault of the imaging system 102. It may be noted that the prescribed languages to be used for logging a service request may be processed by one or more language translators provided in the text processing unit 106. The description of a service request includes a list of descriptive words representative of the fault condition in the imaging system 102.

The memory unit 104 further comprises a historical database 118 configured to store a plurality of system logs, and a plurality of historical service requests, and service log records corresponding to previous time instants for an imaging system 102. The historical database 118 includes historical service requests and a plurality of corresponding historical recommendations. The historical recommendations refer to optimum recommendations corresponding to the plurality of historical service requests. The historical recommendations and historical service requests may pertain to imaging systems in general and may not be specific to that particular imaging system, such as the imaging system 102. The system logs include time stamp values, one or more message codes, fault codes and corresponding message descriptions, associated system events routinely logged by the imaging system 102 during its operation. The historical service request refers to a service request logged in the past and having a corresponding entry in the service log records. The service log record may include a service request identifier, actions taken during servicing, parts replaced and other details related to the resolution of the service request.

The memory unit 104 is also configured to store a service architecture 116 configured to enable processing of the service request by the recommendation unit 108. In one embodiment, the service architecture 116 includes a service dictionary, a part dictionary and a plurality of classification schemes organized in a tree data structure. In one embodiment, the service dictionary includes a plurality of descriptive key-words and a corresponding plurality of message codes extracted from the system logs. The descriptive key-words extracted from a service request are representative of features in the service request. The service dictionary is a joint dictionary having an association between the list of descriptive words and a list of message codes extracted from the log history. Further, the part dictionary includes the plurality of descriptive key-words and a corresponding plurality of part clusters. Each of the plurality of part clusters include two or more similar parts listed in a part list. The plurality of part clusters is generated using one or more part clustering techniques. The part dictionary is a joint dictionary having an association between a cluster description and a list of part cluster names. The part cluster may be represented by cluster codes and are representative of attributes associated with the descriptive key-words.

In general, the service request architecture may include a multi-level hierarchical tree. In particular, the service architecture 116 includes hierarchical classification schemes organized in a tree data structure. This multi-level hierarchical tree data structure of the service architecture includes a plurality of levels with each level represented by a plurality of nodes and a plurality of branches at one or more of the plurality of nodes. Further, the service architecture includes a plurality of classification schemes corresponding to the plurality of nodes. Each of the plurality of nodes includes a classification scheme and a plurality of mathematical rules. Further, each node includes one or more recommendations. In one example, the service architecture includes a two-level hierarchical tree having five nodes. In another embodiment, the service architecture may include a two-level hierarchical tree having seven nodes. In certain embodiments, one or more nodes of the tree may be selected for processing based on specifics of the service request and the structure of the service architecture. Processing of the service request is initiated at a root node and the processing progresses from the root node to subsequent nodes disposed at other levels other than the root node. In certain embodiments, one or more of the plurality of nodes in the tree are processed, for example in a sequential manner. In one embodiment, one node at each level is processed. In one embodiment, the service request is processed at the root node using a first classification scheme to determine a service option at first hierarchical level. It may be noted that the first hierarchical level includes two or more service options. The processing of service request at the root node may be performed automatically using a software or under the supervision of an operator. Each service option at the first hierarchical level may include one or more actions and recommendations.

Further, a classification scheme may also be specified at each of the nodes in the first hierarchical level to direct traversing the tree to next hierarchical levels.

In general, the multi-level hierarchical tree of service request architecture may include a multi-label recommendation at each node. The multi-label recommendations may include a plurality of rules determined by the machine learning unit 112 using the historical log record data. The multi-label recommendation suggests one of a plurality of recommendations that help a service personnel to correct an identified fault of the imaging system 102. Specifically, the multi-label recommendation may include a service code specifying a servicing action, a part code specifying one or more parts to be replaced, an action code specifying one or more actions to be performed during the servicing.

The text processing unit 106 is configured to receive a service request as logged by a user. The text processing unit 106 is configured to parse sentences into a list of descriptive words describing the fault condition. The text processing unit 106 is configured to remove special characters, proper nouns and dates from the service request description. Further, text processing unit 106 is configured to filter out descriptive words from the service request. Further, the text processing unit 106 is configured to create a first binary vector based on the list of descriptive words of the service dictionary. For each service request, a first binary vector is determined based on the service dictionary. The first binary vector is representative of presence of descriptive words in the service dictionary.

In one embodiment, the text processing unit 106 is configured to process the historical service requests extracted from the historical database 118. Specifically, the text processing unit 106 is configured to generate a first plurality of binary vectors corresponding to the plurality of historical service requests based on the service dictionary. The text processing unit 106 is also configured to process a historical service request to create a second binary vector based on the part dictionary. The second binary vector is representative of part replacement status, association of part names with the service request, parts specified in the service request or combinations thereof. The second binary vector is representative of association of descriptive words with the part clusters. Specifically, the text processing unit 106 may be configured to generate a second plurality of binary vectors corresponding to the plurality of historical service requests based on the parts dictionary. In one embodiment, the text processing unit 106 is controlled by the machine learning unit 112 to generate the first plurality of binary vectors and the second plurality of binary vectors.

The recommendation unit 108 is communicatively coupled to the text processing unit 106 and configured to select a classification scheme among the plurality of classification schemes based on the first binary vector, the second binary vector and a deep learning model. In one embodiment, the recommendation unit 108 includes the deep learning model. The recommendation unit 108 is configured to generate a recommendation by traversing the classification scheme based on the service architecture. The recommendation includes at least one of an on-line repair activity, an on-site repair activity and a part replacement activity. In one embodiment, for an on-line repair activity, the service personnel may not need to visit the site where the imaging system 102 is installed. In particular, the on-line repair activity may be performed remotely for the imaging system 102. In one embodiment, where the service architecture has two levels, the recommendation unit 108 is configured to process the service request vector using a first machine learning model to determine a first recommendation. The first machine learning model is a binary classifier configured to generate either a remote servicing option and a dispatch option. When the first recommendation is a remote servicing option, the recommendation unit 108 is further configured to generate one or more remote servicing actions to correct the fault condition. When the first recommendation is a dispatch option, the recommendation unit 108 is further configured to process the service request to generate a second recommendation using a second machine learning model. The second machine learning model is a binary classifier configured to generate either a parts replacement option or a repair option. When the second recommendation is a part replacement option, the recommendation unit 108 is configured to generate a parts list based on a third machine learning model. When the second recommendation is a repair option, the recommendation unit 108 is further configured to generate one of a multiple option using a third machine learning model. The third machine learning model is a multi-label classifier configured to generate one of a plurality of repair options.

In one embodiment, the machine learning unit 112 is configured to generate the service architecture based on the historical database 118. Specifically, the machine learning unit 112 is configured to retrieve a plurality of historical service requests and system logs corresponding to the retrieved historical service requests. The machine learning unit 112 is also configured to service logs with records of parts replaced and actions taken for each of the retrieved historical service request. The machine learning unit 112 is also configured to access a part list having an exhaustive list of parts and their descriptions from the memory unit 104. The machine learning unit 112 is further configured to generate the service dictionary, the part dictionary and the plurality of classification schemes that are used to process the service request to generate the recommendation.

In one embodiment, the machine learning unit 112 is configured to control the text processing unit 106 to initiate parsing of the retrieved historical service requests to generate a list of historical descriptive key-words. Further, the machine learning unit 112 is configured to control the text processing unit 106 to initiate parsing of historical system logs corresponding to the historical service requests to generate a list of historical message codes. The machine learning unit 112 is further configured to establish an association between the plurality of historical descriptive key-words with the plurality of historical message codes to generate the service dictionary.

In one embodiment, the machine learning unit 112 is configured to control the text processing unit 106 to selectively parse part descriptions from the part list to generate a list of part descriptive key-words. The machine learning unit 112 is further configured to control the text processing unit 106 to parse service logs to generate a list of co-occurring or related parts. The term co-occurring parts refers to two or more parts that are simultaneously replaced or repaired frequently during servicing of the imaging system. The term related parts refer to two or more parts operating in conjunction. The machine learning unit 112 is further configured to generate a plurality of part clusters based on the list of part descriptive key-words and the list of co-occurring parts. The machine learning unit 112 is also configured to generate the parts dictionary establishing an association between the plurality of part clusters and the part descriptive key-words. Each part cluster includes similar parts from the parts list. In one embodiment, the part clusters are created using a part clustering technique. Specifically, a part clustering technique may identify similar parts based on common descriptive words found in their parts description. In another embodiment, the part clustering technique may group parts in a single cluster when they are frequently replaced together during a service. In yet another embodiment, the clustering technique may identify similar parts based on similarity of message codes listing the parts. The plurality of part clusters is created by grouping similar parts in each part cluster based on one or metrics representative of similarity between the parts.

The machine learning unit 112 is further configured to control the text processing unit 106 to generate the first plurality of binary vectors and the second plurality of binary vectors corresponding to the plurality of historical service requests based on the service dictionary and the parts dictionary. The machine learning unit 112 is configured to generate one or more machine learning models to be used by the recommendation unit. Further, the machine learning unit 112 is configured to generate a plurality of machine learning models representative of the plurality of classification schemes based on the first plurality of binary vectors, the second plurality of binary vectors and the corresponding historical recommendations. In one embodiment, a machine learning model, such as a neural network model, may be trained based on the first plurality of binary vectors and the second plurality of binary vectors to generate corresponding historical recommendations. In one embodiment, the machine learning unit 112 is configured to operate in an off-line mode and generate the service dictionary, the part dictionary and the plurality of classification models using a plurality of service requests stored in a historical database. In some such embodiments, the machine learning unit may be configured to process a service request to create non-binary vectors based on each of the service dictionary and the part dictionary.

Figure 1B:
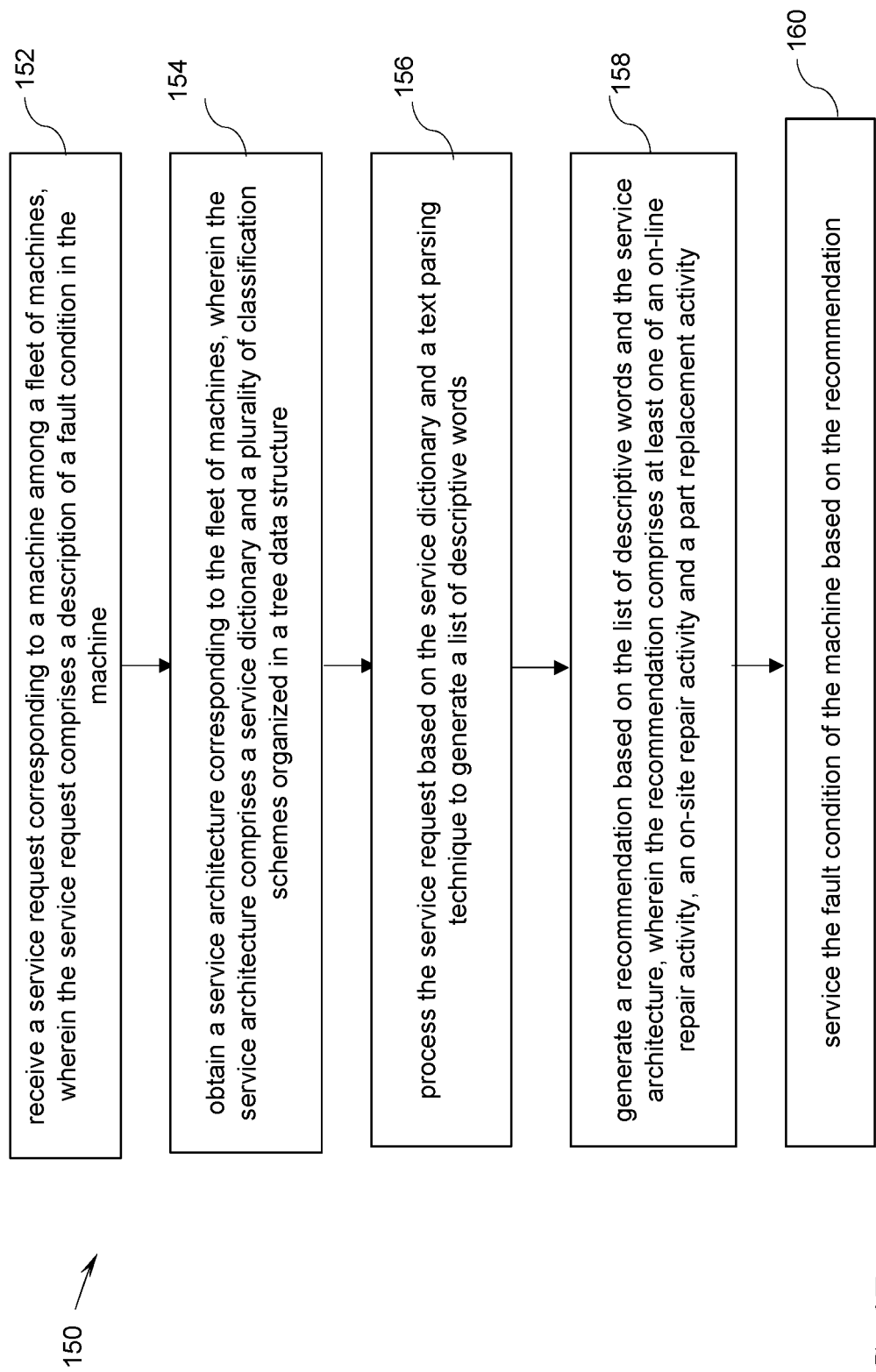
FIG. 1B is a flow chart of a method for maintenance of a machine among a fleet of machines in accordance with an exemplary embodiment.

FIG. 1B is a flow chart of a method 150 for maintenance of a machine among a fleet of machines such as imaging systems in accordance with an exemplary embodiment. The method 150 includes receiving a service request corresponding to machine at step 152. In one embodiment, the service request includes a description of a fault condition in the machine. The service request also includes a time stamp representative of a time instance when the problem was reported (or logged). The method 150 also includes obtaining a service architecture corresponding to the fleet of machines at step 154. The service architecture includes a service dictionary and a plurality of classification schemes organized in a tree data structure. In one embodiment, the service dictionary includes a plurality of descriptive key-words and a plurality of message codes and indicates a one-to-one correspondence between the plurality of descriptive key-words and the plurality of message codes. The method 150 further includes processing the service request based on the service dictionary and a text parsing technique to generate a list of descriptive words as illustrated in step 156. The text processing includes removing special characters, proper nouns and dates from the service request to generate the list of descriptive words. Further, the text processing technique includes creating a first binary vector based on the service dictionary and list of descriptive words corresponding to service request. The first binary vector is representative of presence of descriptive words in the service dictionary.

At step 158, the method includes generating a recommendation based on the list of descriptive words and the service architecture. Specifically, the step 158 includes selecting a classification scheme among the plurality of classification schemes based on the first binary vector and a deep learning model. Further, the step 158 also includes processing the descriptive words using the selected classification scheme. The recommendation includes at least one of an on-line repair activity, an on-site repair activity and a part replacement activity. The method also includes at step 160, servicing the fault condition of the machine based on the generated recommendation.

In one embodiment, the step 154 further includes generating the service architecture based on a historical database having a plurality of historical service requests. Specifically, generating the service architecture involves generating a service dictionary using the plurality of historical service requests and corresponding system logs. Further, generating the service architecture also includes generating a parts dictionary based on a list of part clusters. The part clusters are determined using one or more clustering techniques applied to a parts list. The generating of the service architecture further includes training a machine learning model using the plurality of historical service requests, the service dictionary and the parts dictionary. A plurality of machine learning models corresponding to the plurality of classifications schemes is generated at step 154.

Text parsing techniques for processing the service requests enable automatic processing and provide flexibility of using natural language while submitting the fault description. The hierarchical nature of the service architecture makes it easy for implementation and interpretation. Use of machine learning models helps in generating multi-label classification of faults allowing more than one recommendations when necessary. The maintenance system accommodates tuning of system parameters necessary for achieving trade-off between correct and false recommendations. The maintenance system is configured to learn the machine learning models by making use of historical data without the operator intervention.

Advantageously, automatic processing reduces processing overhead and significantly improves the productivity costs. Experts are freed up from mechanically scanning large amounts of data and are enabled to focus on more productive costs requiring their skillset. Recommendations generated by the maintenance system may be available to the user and unnecessary parts replacement may be avoided or minimized Improved response times enhances customer satisfaction at optimized service contract cost.

Figure 2:
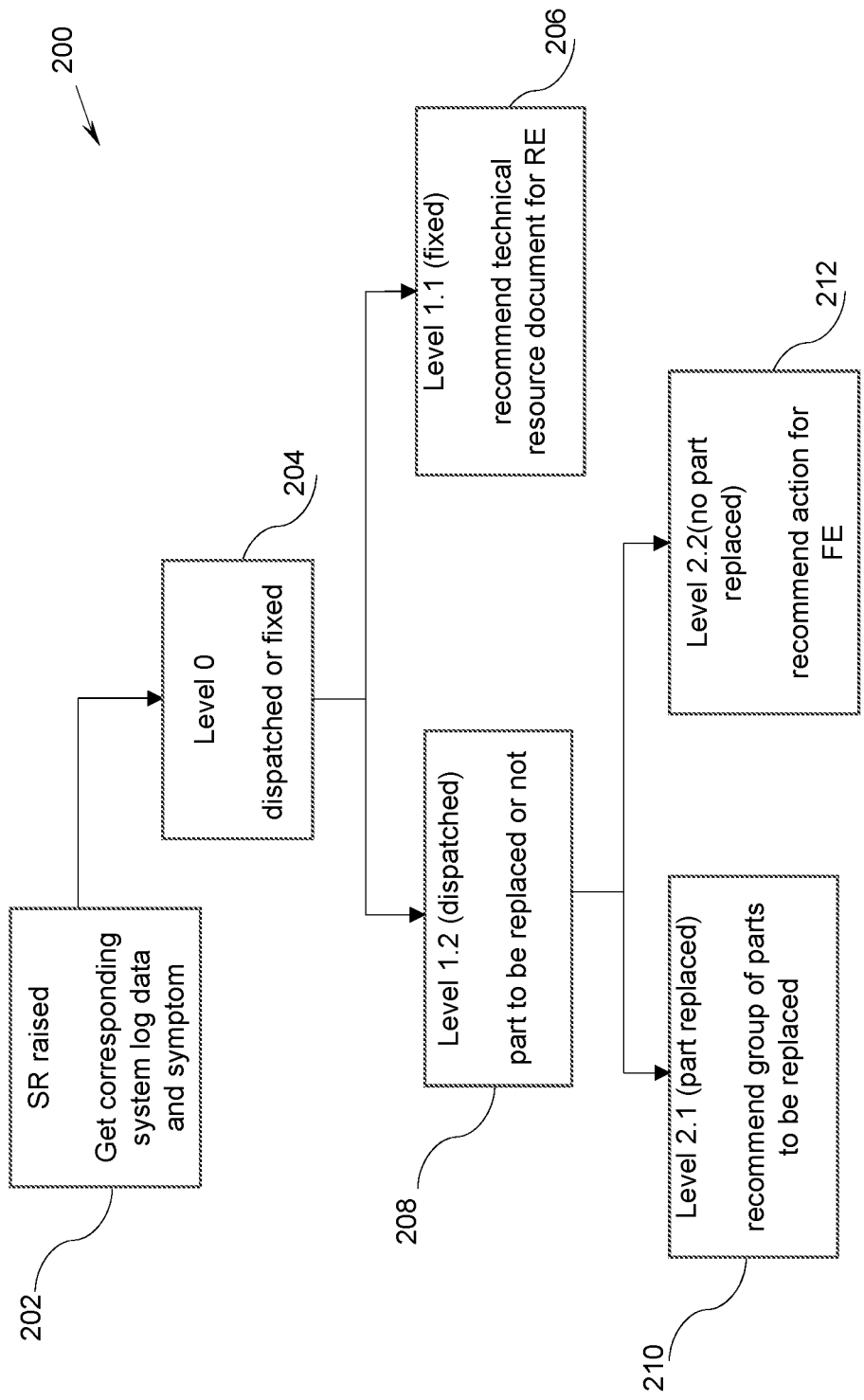
FIG. 2 is a schematic representation of a service architecture for maintenance of a machine among a fleet of machines such as the machine of FIG. 1A in accordance with an exemplary embodiment.

FIG. 2 is a schematic representative of an example service architecture for maintenance of a machine in accordance with an exemplary embodiment. The schematic illustrates a multi-level hierarchical tree data structure, also referred to as "tree," and generally represented by reference numeral 200. The tree 200 includes a plurality of nodes organized in a plurality of levels, where each node includes a corresponding classification scheme. The nodes are representative of a service request, a classification scheme used to process the service request and/or a recommendation. The classification schemes are configured to generate recommendations corresponding to a plurality of servicing options. Specifically, each of the nodes specifies a plurality of processing steps to be performed on a service request to generate one or more recommendations. The plurality of processing steps specified at each of the plurality of nodes is performed by the recommendation unit 108. Further, the recommendation unit 108 traverses the tree 200 starting from a root node representative of a service request 202 till leaf nodes 210, 212 in a second level of the tree 200. In the illustrated embodiment, the tree 200 is shown to include five nodes 204, 206, 208, 210, 212 organized in three levels. The first level includes the root node 204, a first level includes the nodes 206, 208 and the second level includes nodes 210, 212. Although, five nodes and three levels are considered in the illustrated embodiment, higher or lower than five nodes and three levels are envisioned within the purview of the present specification. The tree 200, as illustrated, includes a service request 202 logged by a user. The service request 202 is processed by a first classification scheme 204 configured to generate a first recommendation. If the service request can be resolved by remote servicing, the first recommendation is "remote servicing" 206 action to correct the fault condition remotely by a service personnel. If the service request requires field servicing, the first recommendation is a "dispatch" 208 decision transferring the service request to field service personnel. The remote servicing 206 includes processing the service request by a second classification scheme configured to generate a second recommendation. The second classification is a multi-label classification scheme and the second recommendation includes one or more of a plurality of off-site repair recommendations determined based on the service request.

In the case of a dispatch 208 recommendation, the service request is processed by a third classification scheme to generate a third recommendation. The third classification scheme is a binary classification scheme configured to provide one of a part replacement option and a repairing option. If it is plausible to resolve the service request by one or more repair actions, third recommendation corresponds to "repair" action 212. If part replacement is required, the third recommendation corresponds to a "repair with part replacement" decision 210.

In one embodiment, the repair with part replacement decision 210 includes processing of the service request with a fourth classification scheme configured to generate a fourth recommendation. The fourth classification scheme is a multi-label classification scheme configured to provide a recommendation pertaining to part replacement. In one embodiment, the fourth recommendation includes a list of parts to be replaced to correct the fault of the imaging system 102. Further, in some embodiments, the repair action 212 includes processing the service request by a fifth classification scheme configured to generate a fifth recommendation. The fifth classification scheme is a multi-label classification scheme configured to provide a list of on-site repair recommendations. The fifth recommendation may include step-by-step instructions to be followed by the field engineer to rectify the problem. It may be noted that the first classification scheme, the second classification scheme are binary classification schemes. The third classification scheme, the fourth classification scheme and the fifth classification schemes are multi-label classification schemes. In one embodiment, the recommendation unit 108 may generate multiple recommendations while traversing the tree to resolve a single service request. For example, the recommendation unit 108 may generate a first recommendation using the first classification scheme 204 to resolve one aspect of the service request by remote servicing. The recommendation unit 108 may generate a second recommendation generated by the remote servicing action 206 specifying remote servicing steps. The recommendation unit 108 may further generate a third recommendation generated after dispatch decision 208 to resolve another aspect of the service request by replacing one or more parts. The third recommendation may also suggest resolution of yet another aspect of the service request by on-site repair action. The recommendation unit 108 is also configured to generate a fourth recommendation generated from the part replacement decision 210 specifying the parts to be replaced. The recommendation unit 108 may also generate a fifth recommendation generated from the repair action 212 includes specification of a list of repair actions.

Figure 3:
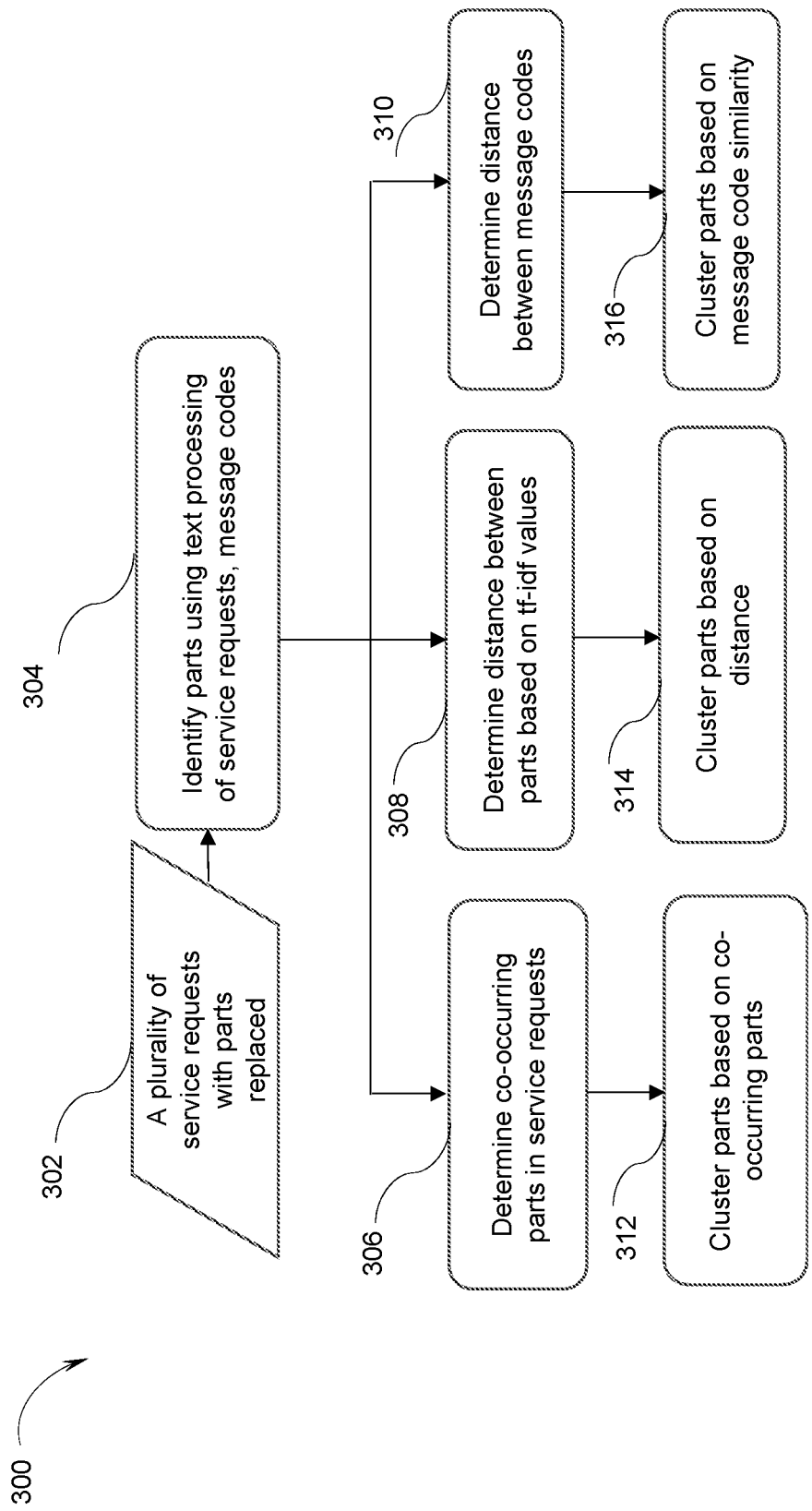
FIG. 3 is a schematic representation of part clustering for maintenance of a machine among a fleet of machines such as the machine of FIG. 1A in accordance with an exemplary embodiment.

FIG. 3 is a schematic 300 representation of part clustering for maintenance of a machine in a fleet of machines in accordance with an exemplary embodiment. The text processing unit 106 of FIG. 1A may include, various text processing blocks 302-316 shown in the schematic 300 of FIG. 3. In one embodiment, the text processing unit 106 is configured to generate a part cluster among the plurality of part clusters by determining part names from a plurality of service requests. Specifically, a plurality of service requests which are resolved previously and a corresponding part lists that are replaced or repaired are considered as illustrated in block 302. A plurality of message codes corresponding to the service requests and part lists are also considered.

Further, the text processing unit, such as the text processing unit 106 of FIG. 1A, is configured to determine a term frequency-inverse document frequency (tf-idf) parameter for each of the part names as illustrated in block 304. The term "tf-idf" in a text mining context is an abbreviation for "term frequency-inverse document frequency" and represents a metric for a term (or a word) in the text across several documents or records. The "term frequency" of a word in a text refers to a frequency of occurrence of the word in a text corpus, and the "document frequency" corresponding to a word refers to frequency of occurrence of the word in a document (or a record). The term tf-idf combines term frequency and the document frequency by offsetting the document frequency by term frequency. The term "density-based spatial clustering of applications with noise" also referred to as "DBSCAN", is a data clustering technique configured to group a subset of data points that are closely packed together with reference to a pre-specified metric.

The text processing of the block 304 may further include identifying co-occurring parts in service requests, similarity of message codes and the frequency of occurrence of parts in the service requests. One or more metrics such as tf-idf parameter for a part code and/or a message code may be generated in the block 302. In one embodiment, the text processing unit 106 is further configured to identify co-occurring parts corresponding to service requests as shown in block 306. A plurality of association rules is identified based on the co-occurring parts. A plurality of association metrics such as, but not limited to, a support value, a confidence value, and a lift value determined for each association rule among the plurality of association rules. The term "confidence value" refers to the percentage of occurrence of an immediate consequent when an antecedent has occurred. The term "association rule" refers to an association of concepts, entities, and such with an antecedent and a consequent. The term 'support value' refers to the percentage occurrence of an association. The term 'lift value' refers to a bias in the occurrence of an association with reference to an expected occurrence. The text processing unit 106 is further configured to cluster a plurality of co-occurring parts based on the confidence value and the lift value in block 312.

In one embodiment, a distance metric such as, but not limited to, a cosine similarity metric is used to determine a distance between a pair of service requests. The tf-idf parameter corresponding to the two service requests of the pair of service requests may be used for determining the distance metric between the two service requests. A plurality of distance values is determined corresponding to a plurality of pairs of service requests. A plurality of distance values between a pair of parts may be determined in block 308 based on the plurality of service requests. In block 310, a clustering technique is used to identify similar parts based on the plurality of pairs of service requests, a plurality of distance values corresponding to the plurality of pairs of service requests, and parts associated with each of the plurality of pairs of service requests. In one embodiment, DBSCAN technique is used to generate a cluster of similar parts.

In another embodiment, the text processing at block 304 may be used to generate a plurality of distance values between a plurality of pair of message codes as illustrated in block 310. Each distance value among the plurality of distance values is representative of similarity between the paired parts. The parts associated with the message codes are clustered in block 316 based on the plurality of distance values.

Figure 4:
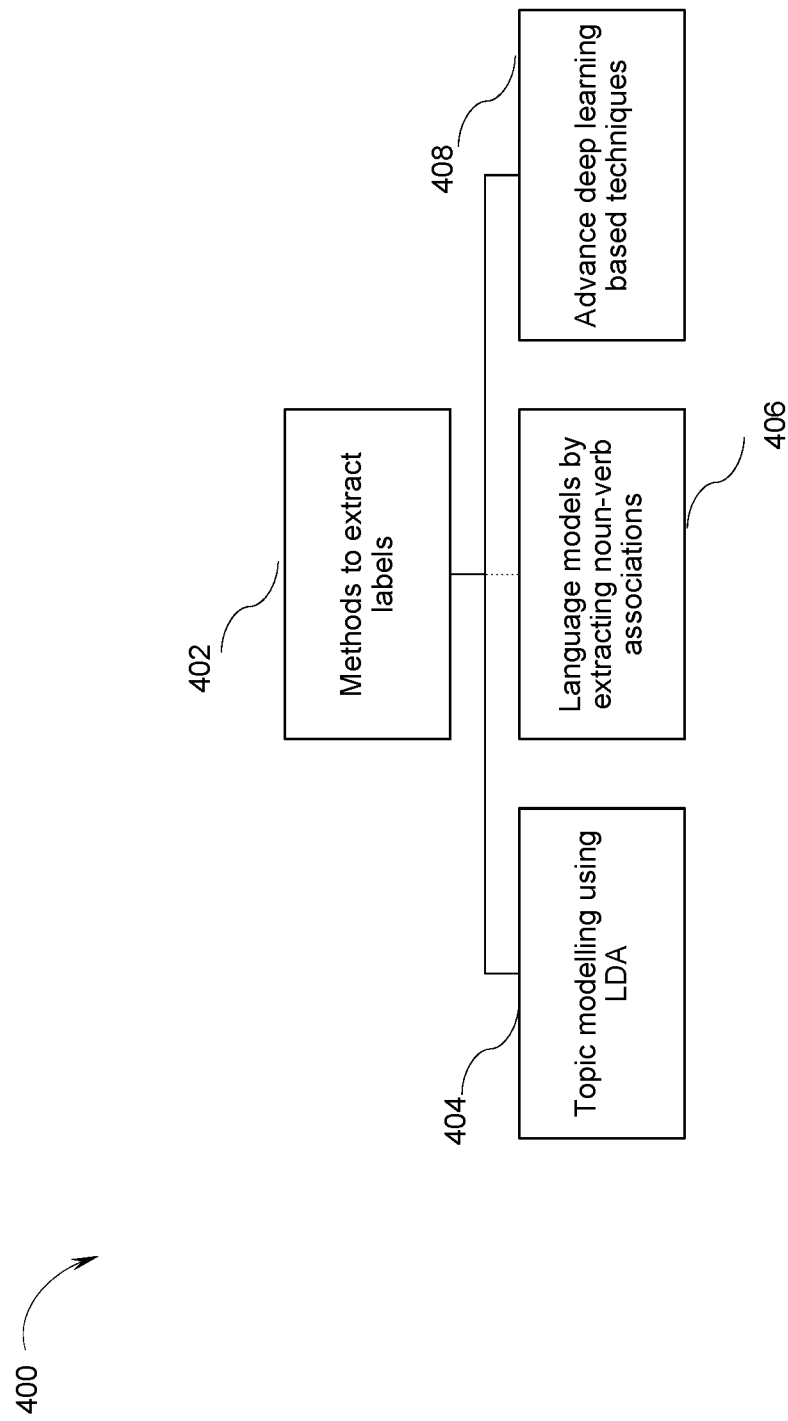
FIG. 4 is a schematic representative of label extraction methods for maintenance of a machine among a fleet of machines such as the machine of FIG. 1A in accordance with an exemplary embodiment.

FIG. 4 is a schematic 400 representative of label extraction methods used in maintenance of a machine among a fleet of machines in accordance with an exemplary embodiment. The label extraction methods are used to extract a plurality of labels from description of one or more on-site repair actions performed by field personnel. The labels are further used in mapping on-site repair actions with a finite list of action codes. In one embodiment, the plurality of labels is generated based on a generative statistical model. In another embodiment, the plurality of labels is generated based on discriminative statistical model. The generative statistical model includes a joint probability of words and topics, and the discriminatory statistical models include a conditional probability of topics with respect to the words. In one embodiment, a latent Dirichlet allocation (LDA) model is used to determine the plurality of labels in a Bayesian framework as illustrated in block 402. The LDA model uses Dirichlet distribution on topics and words parametrized by a vector of real numbers. In another embodiment, a language model is used for determining the plurality of labels by extracting associations between for example, nouns and verbs, as illustrated in block 404. The language model is a joint probability distribution over sequences of words. Specifically, the language models use a probability distribution over an n-gram which is a continuous sequence of n words is a given text. In an alternate embodiment, the plurality of labels may also be generated based on advanced deep learning techniques in block 406.

Disclosed embodiments enable automatic processing of service requests and thereby reduce the response time and enhance the efficiency of servicing of machines such as imaging systems. Adoption of a service architecture having a plurality of classification scheme reduces manual overhead while processing the service requests without compromising on accuracy.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

We claim:

1. A method for maintenance of a machine among a fleet of machines, comprising:
   receiving a service request corresponding to a machine, wherein the service request comprises a description of a fault condition in the machine;
   retrieving log record data corresponding to the fleet of machines, wherein the log record data comprises a plurality of historical service requests, a plurality of recommendations corresponding to each of the plurality of historical service requests, system logs comprising a plurality message codes, a part list comprising part descriptions, or a combination thereof;
   obtaining a service architecture corresponding to the fleet of machines, wherein the service architecture comprises a service dictionary, a plurality of classification schemes organized in a tree data structure, and a part dictionary comprising a plurality of part cluster names and corresponding plurality of part cluster descriptions, wherein the part dictionary is based on the plurality of historical service requests, the plurality of recommendations, and the part list;
   processing the service request based on the service dictionary and a text parsing technique to generate a list of descriptive words;
   generating a recommendation based on the list of descriptive words and the service architecture, wherein the recommendation comprises at least one of an on-line repair activity, an on-site repair activity and a part replacement activity; and
   servicing the fault condition of the machine based on the recommendation.

2. The method of claim 1, wherein the service dictionary comprises a plurality of descriptive key-words and a corresponding plurality of message codes extracted from system logs.

3. The method of claim 1, wherein processing the service request comprises:
   removing special characters, proper nouns and dates from the service request to generate the list of descriptive words; and
   creating a first binary vector based on the service dictionary and list of descriptive words corresponding to the service request, wherein the first binary vector is representative of presence of descriptive words of the list of descriptive words in the service dictionary.

4. The method of claim 3, wherein generating the recommendation comprises:
   selecting a classification scheme among the plurality of classification schemes based on the first binary vector and a deep learning model; and
   evaluating a machine learning model corresponding to the classification schemes based on the first binary vector.

5. The method of claim 1, wherein obtaining the service architecture comprises:
   determining the service dictionary based on the plurality of historical service requests, the plurality of recommendations and the system logs; and
   determining the plurality of classification schemes based on the log record data, the service dictionary and the part dictionary.

6. The method of claim 5, wherein determining the service dictionary comprises:
   determining a plurality of descriptive key-words from the plurality of historical service requests using a text processing technique;
   extracting a plurality of message codes from the system logs, corresponding to the plurality of historical service requests; and
   associating the plurality of message codes with the plurality of descriptive key-words in the service dictionary.

7. The method of claim 5, wherein determining the parts dictionary comprises:
   determining part names corresponding to a plurality of historical service requests;
   determining a term frequency-inverse document frequency parameter for each of the part names;
   determining a distance between a pair of service requests using cosine similarity metric;
   clustering a plurality of part names based on a density-based spatial clustering of applications with noise technique.

8. The method of claim 7, wherein generating the parts dictionary comprises clustering a plurality of co-occurring parts from association rules based on a confidence value and a lift value.

9. The method of claim 5, wherein obtaining the service architecture comprises:
   determining a first classification scheme and a second classification scheme among the plurality of classification schemes based on the log record data, the service dictionary and the part dictionary, wherein the first classification scheme is a binary classification scheme configured to provide one of a remote servicing option and a field servicing option, and wherein the second classification scheme is a multi-label classification scheme configured to provide a plurality of off-site repair recommendations to be performed.

10. The method of claim 9, wherein obtaining the service architecture comprises determining a third classification scheme, a fourth classification scheme and a fifth classification scheme among the plurality of classification schemes based on the log record data, the service dictionary and the part dictionary, wherein the third classification scheme is a binary classification scheme configured to provide one of a part replacement option and a repairing option, wherein the fourth classification scheme is a multi-label classification scheme configured to provide a list of parts to be replaced, and wherein the fifth classification scheme is a multi-label classification scheme configured to provide a list of on-site repair recommendations.

11. A system for maintenance of a machine among a fleet of machines, comprising:
    a memory unit configured to:
      store a request database comprising a service request corresponding to the machine, wherein the service request comprises a description of a fault condition in the machine;
      retrieve log record data corresponding to the fleet of machines, wherein the log record data comprises a plurality of historical service requests, a plurality of recommendations corresponding to each of the plurality of historical service requests, system logs comprising a plurality message codes, a part list comprising part descriptions, or a combination thereof; and store a service architecture corresponding to the fleet of machines, wherein the service architecture comprises a service dictionary, a plurality of classification schemes organized in a tree data structure, and a part dictionary comprising a plurality of part cluster names and corresponding plurality of part cluster descriptions; and a machine learning unit communicatively coupled to the memory unit and configured to:

determine the service dictionary based on the plurality of historical service requests, the plurality of recommendations, and the system logs; and determine the part dictionary based on the plurality of historical service requests, the plurality of recommendations, and the part list;

a text processing unit communicatively coupled to the memory unit and configured to process the service request based on the service dictionary and a text parsing technique to generate a list of descriptive words;

a recommendation unit communicatively coupled to the text processing unit and configured to generate a recommendation based on the list of descriptive words and the service architecture, wherein the recommendation comprises at least one of an on-line repair activity, an on-site repair activity and a part replacement activity; and a controller unit communicatively coupled to the recommendation unit and configured to service the fault condition of the machine based on the recommendation.

12. The system of claim 11, wherein the service dictionary comprises a plurality of descriptive key-words and a corresponding plurality of message codes extracted from system logs.

13. The system of claim 11, wherein the text processing unit is further configured to:

remove special characters, proper nouns and dates from the service request to generate a list of descriptive words; and create a first binary vector based on the service dictionary and list of descriptive words corresponding to service request, wherein the first binary vector is representative of presence of descriptive words in the service dictionary.

14. The system of claim 13, wherein the recommendation unit is further configured to:

select a classification scheme among the plurality of classification schemes based on the first binary vector and a deep learning model; and evaluate a machine learning model corresponding to the classification scheme based on the first binary vector.

15. The system of claim 11, wherein the machine learning unit is further configured to:
determine the plurality of classification schemes based on the log record data, the service dictionary and the part dictionary.

16. The system of claim 15, wherein the machine learning unit is further configured to:

determine part names corresponding to a plurality of service requests;

determine a term frequency-inverse document frequency parameter for each of the part names;

determine a distance between a pair of service requests using cosine similarity metric;

cluster a plurality of part names based on Density-based spatial clustering of applications with noise.

17. The system of claim 16, wherein the machine learning unit is further configured to cluster a plurality of co-occurring parts from association rules based on a confidence value and a lift value.

18. The system of claim 17, wherein the machine learning unit is configured to determine a first classification scheme and a second classification scheme among the plurality of classification schemes, wherein the first classification scheme is a binary classification scheme configured to provide one of a remote servicing option and a field servicing option and wherein the second classification scheme is a multi-label classification scheme configured to provide a plurality of off-site repair recommendations to be performed.

* * * * *